(12) United States Patent
Huang

(10) Patent No.: US 6,860,828 B2
(45) Date of Patent: Mar. 1, 2005

(54) BELT TENSION ADJUSTMENT APPARATUS AND AN OPTICAL SCANNER USING THE SAME

(75) Inventor: Kuo-Ching Huang, Taipei (TW)

(73) Assignee: Primax Electronics Ltd., Taipei (TW)

( * ) Notice: Subject to any disclaimer, the term of this patent is extended or adjusted under 35 U.S.C. 154(b) by 72 days.

(21) Appl. No.: 10/065,206

(22) Filed: Sep. 25, 2002

(65) Prior Publication Data

US 2003/0232677 A1 Dec. 18, 2003

(30) Foreign Application Priority Data

Jun. 17, 2002 (TW) ........................................ 91113125 A (51) Int. Cl.[7] .............................. F16H 7/08; F16H 7/22
(52) U.S. Cl. ..................................................... 474/101
(58) Field of Search ................................ 474/101, 111, 474/140, 117, 115; 254/218, 132.252, 134, 260; 400/352, 162.1, 328, 335, 319–320; 347/37–39

(56) References Cited

U.S. PATENT DOCUMENTS

| | | | | |
|---|---|---|---|---|
| 369,023 A | * | 8/1887 | Newell | ....................... 474/101 |
| 3,948,114 A | * | 4/1976 | Koinzan | ....................... 474/101 |
| 5,232,407 A | * | 8/1993 | Wolf et al. | ................... 474/101 |
| 5,431,371 A | * | 7/1995 | Daniels et al. | ............... 254/218 |
| 5,964,542 A | * | 10/1999 | Ruhe et al. | .................. 400/352 |
| 6,340,221 B1 | * | 1/2002 | Driggers et al. | .............. 347/37 |
| 6,406,393 B1 | * | 6/2002 | Chen | ........................... 474/101 |
| 6,508,534 B1 | * | 1/2003 | Yusef et al. | ................... 347/37 |
| 6,598,956 B2 | * | 7/2003 | Yusef et al. | ................... 347/37 |

FOREIGN PATENT DOCUMENTS

| | | | | |
|---|---|---|---|---|
| DE | 61286 | * | 2/1897 | ................... 474/101 |
| JP | 57-134054 A | * | 8/1982 | ................... 474/111 |
| JP | 08-303534 A | * | 11/1996 | ............. F16H/7/08 |

* cited by examiner

Primary Examiner—Marcus Charles (57) ABSTRACT

A belt tension adjustment apparatus and an optical scanner using the same. The belt tension adjustment apparatus includes a plate spring and/or a tension spring. Utilizing the elasticity of the plate spring or the elastic forces provided by the plate spring and the tension spring, a section of the transmission belt bends to produce a tension in the belt. With the belt tension adjustment apparatus, belt tension in the transmission belt can be easily adjusted and hence the belt can be easily mounted or dismounted from the belt wheels during installation, maintenance or adjustment.

16 Claims, 6 Drawing Sheets

BELT TENSION ADJUSTMENT APPARATUS AND AN OPTICAL SCANNER USING THE SAME

CROSS REFERENCE TO RELATED APPLICATIONS

This application claims the priority benefit of Taiwan application serial no. 91113125, filed Jun. 17, 2002.

BACKGROUND OF INVENTION

1. Field of Invention

The present invention relates to a belt tension adjustment apparatus. More particularly, the present invention relates to an apparatus for adjusting the tension of a transmission belt inside an optical scanner.

2. Description of Related Art

Due to the immense popularity of home computer products, image capture, processing and modification has become a favorite pastime for people. Since an image of whatever content must be captured and fed to a computer, a scanner has become an indispensable peripheral device of the computer. Documents, journals, texts and pictures are now routinely captured by a scanner and transmitted to a personal computer for further treatment. Among the scanners, the platform scanner is the common type. In a platform scanner, a scanning module capable of shuttling back and forth to scan a document on a transparent platform is installed underneath the transparent platform. The scanning module is externally driven by a transmission system that often includes a servo-controlled motor, a set of gear wheels and a belt. Before scanning a document, the document is placed on the transparent platform and then a cover panel is lowered onto the document so that the document is pressed firmly against the transparent panel.

Figure 1:
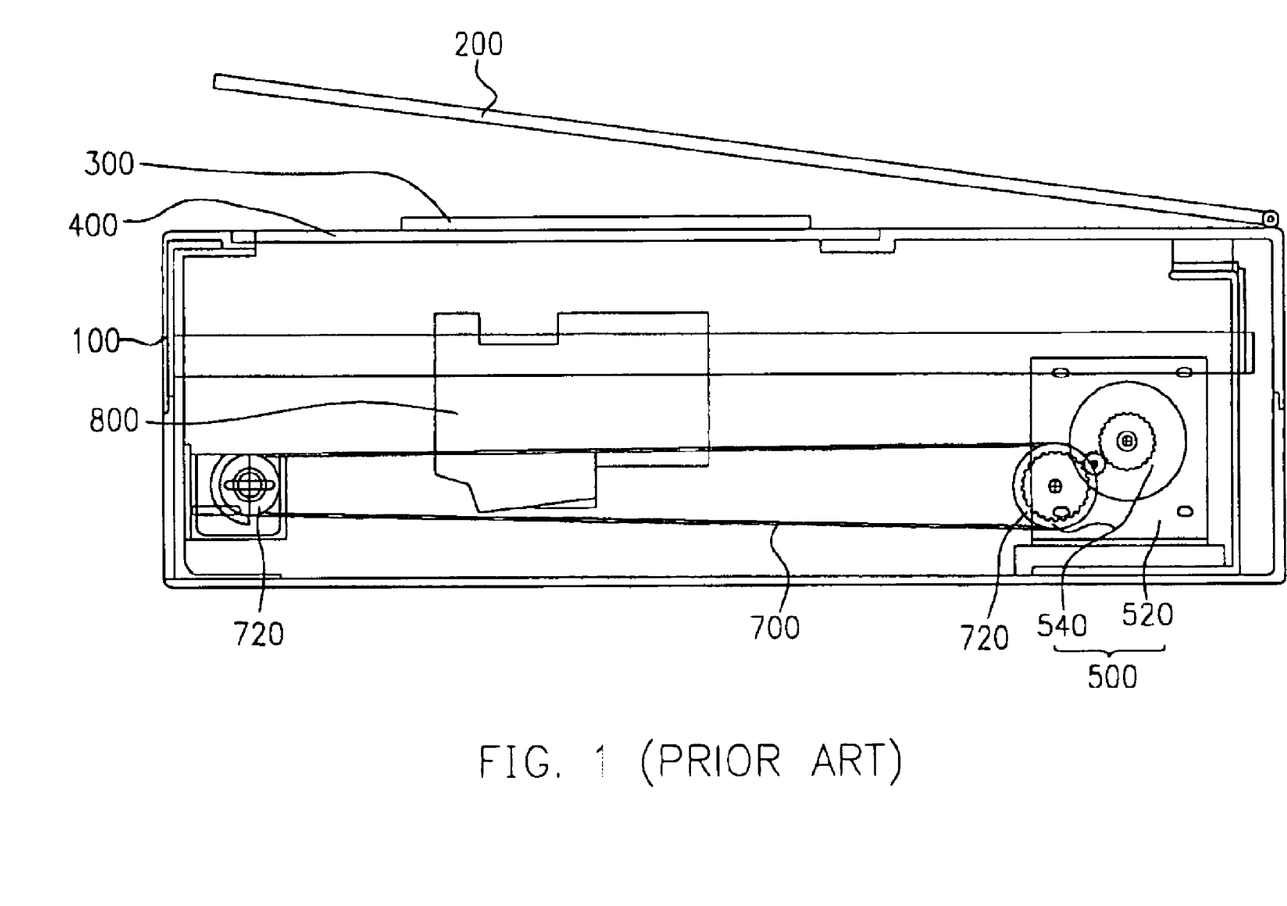
FIG. 1 is a schematic cross-sectional side view of a conventional optical scanner.

FIG. 1 is a schematic cross-sectional side view of a conventional optical scanner. As shown in FIG. 1, the optical scanner includes a main body casing 100, a scanning module 800, a transmission system 500, a transmission belt 700, two belt wheels 720 and a cover panel 200. The main body casing 100 has a transparent panel 400 over the top. The scanning module 800, the transmission system 500, the transmission belt 700 and the two belt wheels 720 are all enclosed within the main body casing 100. The transmission belt 700 wraps around the pair of belt wheels 720. One belt wheel 720 is linked to and driven by the transmission system 500. The belt wheel 720 in turn drives the transmission belt 700 in such a way that the scanning module 800 attached to the belt 700 reciprocates forward and backward inside the main body casing 100 underneath the transparent panel 400. Before scanning a document 300, the document 300 is horizontally placed over the transparent panel 400 and then the cover panel 200 is lowered onto the document 300. The transmission system 500 includes an electric motor 520 and a set of gear wheels 540. Power is fed to the electric motor 520 to rotate the set of gear wheels. Once the gear wheels are driven, the belt wheel 720, the transmission belt 700 and the scanning module 800 attached to the transmission belt are all set into motion to scan the document 300 on the transparent panel 400.

In general, a constant tension must be maintained in the transmission belt 700 that straddles around the two belt wheels 720 in order to drive the scanning module 800 along smoothly. Hence, the transmission belt 700 must be tensioned up during assembly to provide the constant tension.

To adjust or conduct a routine maintenance, the tension in the belt 700 must be released before dismantling the components. The most direct method of releasing the tension in the belt 700 is to loosen up one of the belt wheels 720 and moves the component such that the distance between the pair of belt wheels 720 is shortened. However, this tension-releasing method is time-consuming especially for the repair technicians who have to unleash belt tension frequently.

SUMMARY OF INVENTION

Accordingly, one object of the present invention is to provide a belt tension adjustment apparatus. Through intrinsic elasticity of the belt tension adjustment apparatus, a portion of the transmission belt is bent to set up a proper tension. Hence, the belt tension adjustment apparatus not only facilitates the adjustment of belt tension, but also quickens the installation, maintenance and dismantling of the transmission belt.

A second object of this invention is to provide a belt tension adjustment apparatus that incorporates a plate spring. Through the tension force provided by the plate spring, a portion of the transmission belt is bent to set up a proper tension. Hence, the plate spring not only facilitates the adjustment of belt tension, but also quickens the installation, maintenance and dismantling of the transmission belt.

A third object of this invention is to provide a belt tension adjustment apparatus that incorporates a helical tension spring. Through the tension force provided by the helical tension spring, a portion of the transmission belt is bent to set up a proper tension force in the belt. Hence, the helical tension spring not only facilitates the adjustment of belt tension, but also quickens the installation, maintenance and dismantling of the transmission belt.

To achieve these and other advantages and in accordance with the purpose of the invention, as embodied and broadly described herein, the invention provides a belt tension adjustment apparatus for maintaining a proper tension in a transmission belt inside a station setup. The station setup includes a main body casing, a pair of belt wheels and a transmission system. The belt wheels, the transmission system and the transmission belt are all enclosed inside the main body casing. The transmission belt wraps around the two belt wheels. The transmission system is linked to one of the belt wheels for driving the belt wheel and moving the transmission belt. The belt tension adjustment apparatus includes a plate spring and/or a helical tension spring. The plate spring bows slightly in the middle with each end of the plate spring gripping a portion of the transmission belt so that a section of the belt is bent to provide a proper tension force. A helical tension spring may also be added to the plate spring such that each end of the helical tension spring is hooked to one end of the plate spring. The helical tension spring provides an auxiliary tension that prevents a slackening of the plate spring due to elastic fatigue. Such elastic fatigue may result from prolonged use or temperature fluctuation in the surroundings.

This invention also provides a belt tension adjustment apparatus for an optical scanner. The optical scanner includes at least a main body casing, a scanning module, a transmission system, a pair of belt wheels and a transmission belt. The main body casing has a transparent platform thereon and the scanning module is capable of reciprocating backward and forward inside the main body casing underneath the transparent platform for scanning a document placed on top of the transparent platform. The transmission system, the transmission belt and the belt wheels are enclosed inside the main body casing. The transmission belt wraps around the two belt wheels. The transmission system is linked to one of the belt wheels for driving the belt wheel and moving the transmission belt as well as the scanning module attached to the transmission belt. The belt tension adjustment apparatus includes a plate spring and/or a helical tension spring. The plate spring bows slightly in the middle with each end of the plate spring gripping a portion of the transmission belt so that a section of the belt is bent to provide a proper tension force. A helical tension spring may also be added to the plate spring such that each end of the helical tension spring is hooked to one end of the plate spring. The helical tension spring provides an auxiliary tension that prevents a slackening of the plate spring due to elastic fatigue. Such elastic fatigue may result from prolonged use or temperature fluctuation in the surroundings.

This invention also provides an optical scanner. The optical scanner comprises a main body casing, a pair of belt wheels, a transmission belt, a scanning module, a transmission system, a plate spring and a helical tension spring. The main body casing has a transparent panel thereon. In addition, the main body casing encloses the belt wheels, the transmission belt, the scanning module and the transmission system. The transmission belt wraps around the belt wheels. The scanning module is capable of reciprocating backward and forward inside the main body casing underneath the transparent panel. The scanning module is attached to the transmission belt so that the scanning module moves when the belt is driven. The transmission system is connected to one of the belt wheels for driving the transmission belt. The plate spring bows slightly in the middle with each end of the plate spring gripping a portion of the transmission belt so that a section of the belt is bent to provide a proper tension force. Furthermore, a helical tension spring may also be added to the plate spring such that each end of the helical tension spring is hooked to one end of the plate spring. The helical tension spring provides an auxiliary tension that prevents a slackening of the plate spring due to elastic fatigue. Such elastic fatigue may result from prolonged use or temperature fluctuation in the surroundings.

The aforementioned plate spring deforms elastically when subjected to a force between a first configuration when the plate spring is wide open and a second configuration when the plate spring is fully closed. When the ends of the plate spring are attached to the transmission belt, the plate spring is in a third configuration intermediate between the first configuration and the second configuration.

The plate spring has a gripping structure on each end suitable for gripping the transmission belt. Furthermore, the plate spring has a latching groove structure at each end and the helical tension spring has a latching hook at each end. The two latching hook structures at the end of the helical tension spring are hooked onto the respective latching groove structures at the end of the plate spring.

The transmission system further includes an electric motor and a transmission gearset. The motor is connected to the transmission gearset and one of the belt wheels is connected to the gearset. The transmission belt includes a belt with internal teeth lining.

One major aspect of this invention is the utilization of the spring force provided by the plate spring and/or the helical tension spring to bend a section of the transmission belt so that proper tension is set up in the belt.

A second major aspect of this invention is that the tension in the transmission belt can be easily adjusted by opening up the plate spring with force. This facilitates the installation, maintenance and dismantling of the transmission belt.

It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

Reference will now be made in detail to the present preferred embodiments of the invention, examples of which are illustrated in the accompanying drawings. Wherever possible, the same reference numbers are used in the drawings and the description to refer to the same or like parts.

This invention provides a belt tension adjustment apparatus. Utilizing the elasticity of the apparatus, a portion of a transmission belt is bent to provide a proper tension in the belt. The apparatus also facilitates the adjustment of belt tension so that the belt is easily mounted or dismounted during assembly, maintenance or adjustment. The belt tension adjustment apparatus is made using a plate spring, for example. Using the elastic force provided by the plate spring, a local section of the transmission belt is bent to produce a tension force that facilitates the adjustment of belt tension and the mounting/dismounting of the transmission belt during assembly, maintenance or adjustment. To prevent elastic fatigue in the apparatus due to prolonged use or environmental factors, an additional tension spring such as a helical tension spring is provided. The tension provided by the plate spring and the auxiliary tension provided by the tension spring bends a section of the transmission belt to set up a tension in the belt that facilitates the mounting/dismounting of the belt during assembly, maintenance or adjustment.

Figure 2:
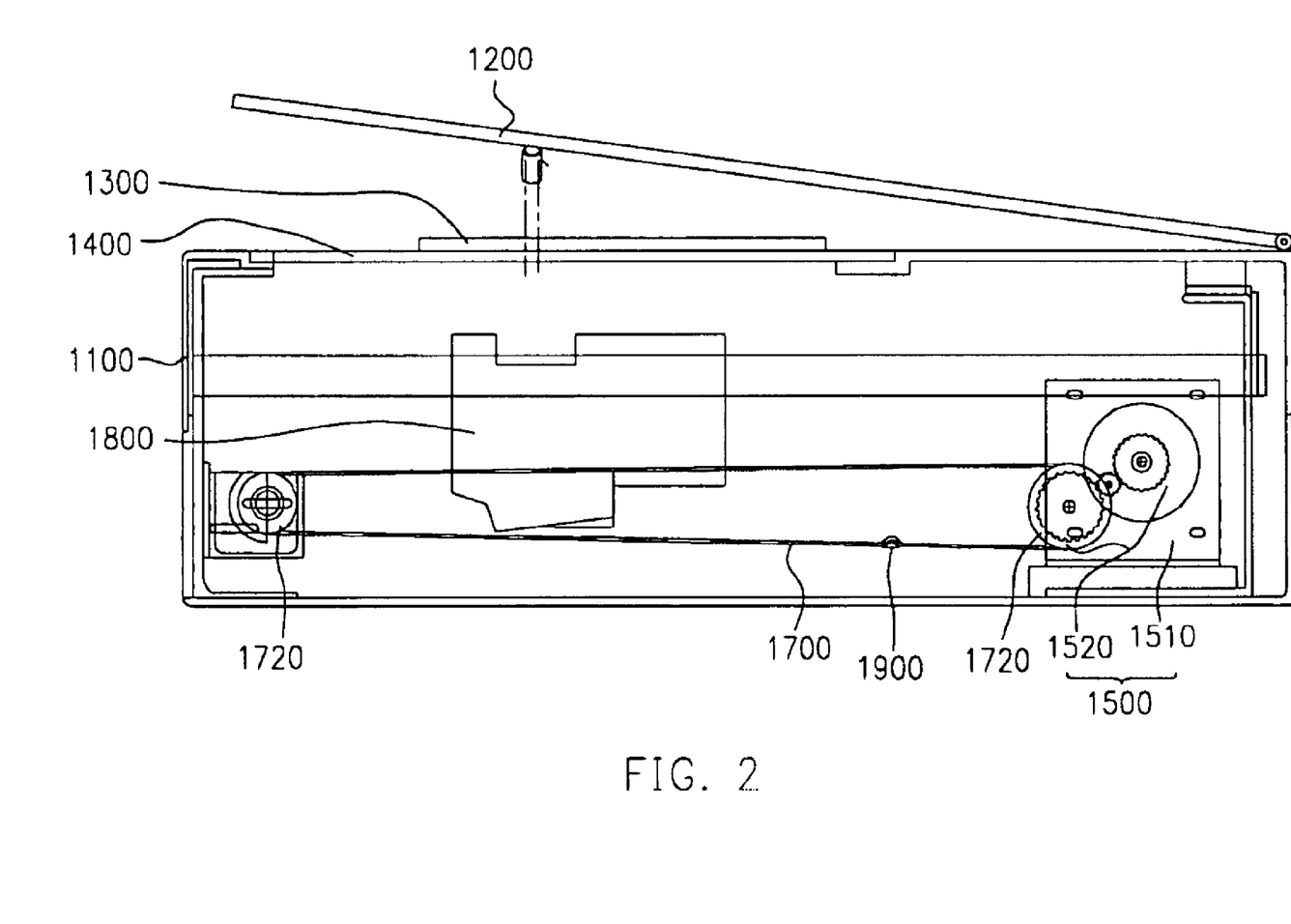
FIG. 2 is a schematic cross-sectional side view of an optical scanner according to one embodiment of the invention.

FIG. 2 is a schematic cross-sectional side view of an optical scanner according to one embodiment of this invention. As shown in FIG. 2, the optical scanner includes a main body casing 1100, a scanning module 1800, a transmission system 1500, a transmission belt 1700, a pair of belt wheels 1720 and a document cover 1200. The main body casing 1100 has a transparent panel 1400 thereon. The scanning module 1800, the transmission system 1500, the transmission belt 1700 and the two belt wheels 1720 are all enclosed within the main body casing 1100. The transmission belt 1700 wraps around the belt wheels 1720. One of the belt wheels 1720 is connected to the transmission system 1500. The transmission belt 1700 moves when the belt wheel 1720 is driven by the transmission system 1500. The scanning module 1800 is attached to the transmission belt 1700 so that the scanning module 1800 is able to reciprocate forward and backward inside the main body casing 1100 underneath the transparent panel 1400 when the belt 1700 is driven.

Before scanning a document 1300, the document 1300 is placed over the transparent panel 1400 and the document cover 1200 is lowered onto the glass panel 1400. The transmission system 1500 further includes an electric motor 1510 and a gearset 1520. The motor 1510 is coupled to the gearset 1520 and the shaft of the gearset 1520 is coupled to one of the belt wheels 1720. To scan the document 1300, the motor 1510 drives the gearset so that the belt wheel 1720 pulls transmission belt and moves the scanning module 1800 attached to the transmission belt 1700 horizontally underneath the transparent panel 1400.

Figure 3:
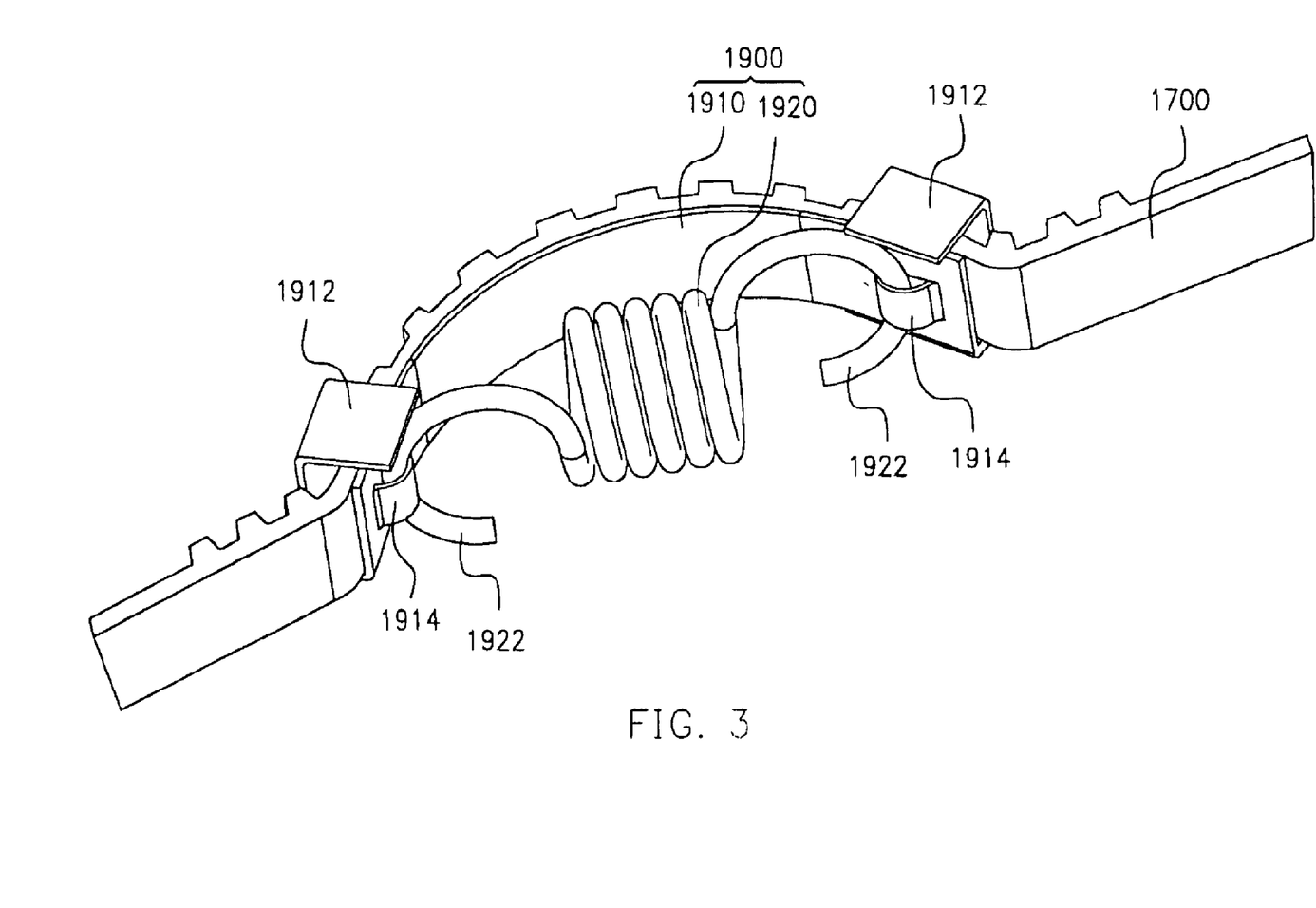
FIG. 3 is a perspective view of a belt tension adjustment apparatus according to the invention.

To maintain a constant tension in the transmission belt 1700 so that the scanning module 1800 is pulled along its guiding rail smoothly, this invention provides a belt tension adjustment apparatus 1900. FIG. 3 is a perspective view of a belt tension adjustment apparatus according to this invention. Through the elastic force provided by the apparatus 1900, proper tension is produced in the transmission belt 1700. The belt tension adjustment apparatus 1900 is a plate spring 1910 with or without an additional tension spring 1920 attached to the plate spring 1910.

Figure 4:
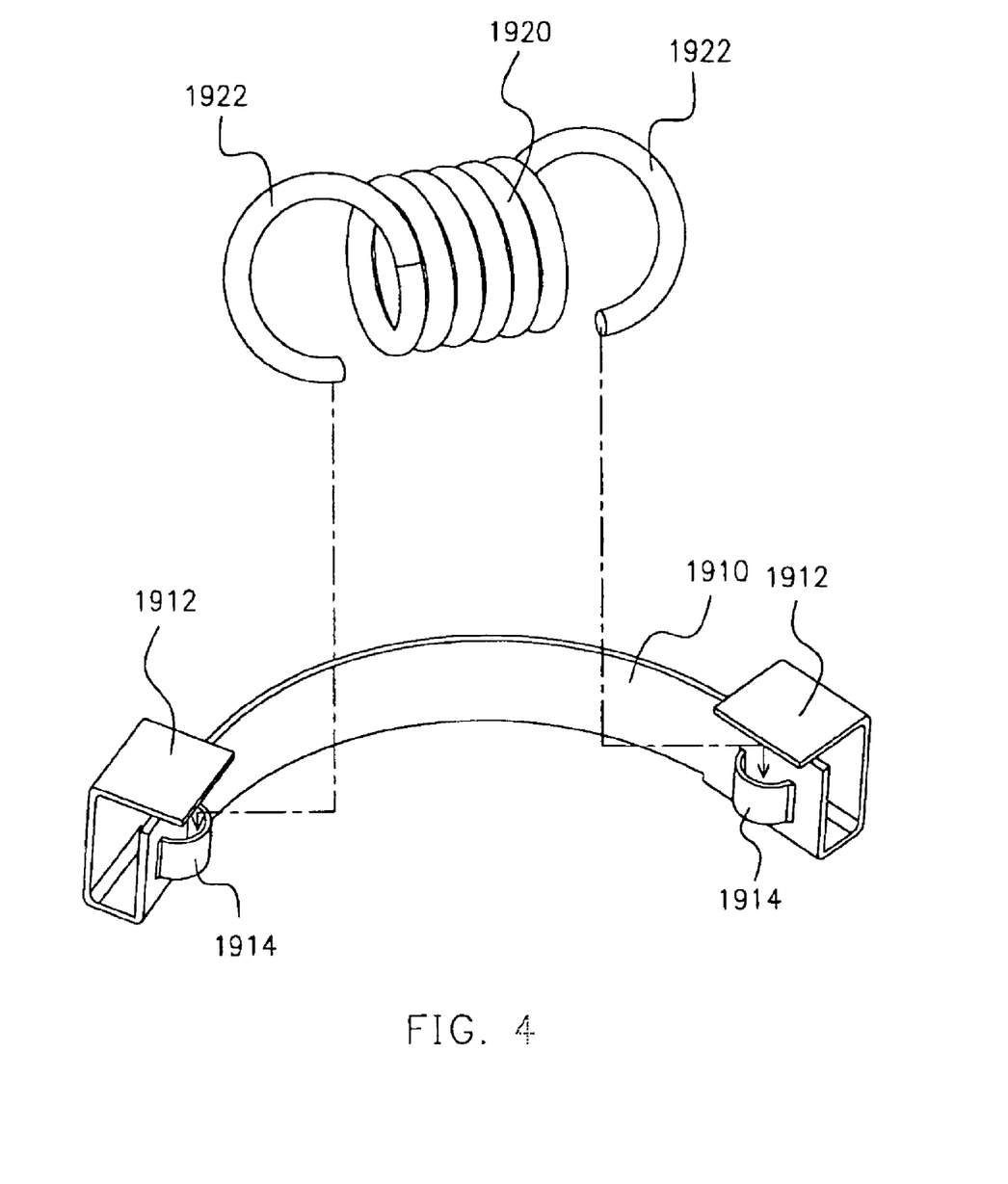
FIG. 4 is a perspective view of the components in a belt tension adjustment apparatus according to the invention.

The plate spring 1910 bows in the middle with each end having a gripping structure 1912 for gripping the transmission belt 1700 so that a proper tension is maintained in the belt 1700. The tension spring 1920 can be a helical tension spring, for example. FIG. 4 is a perspective view of the components in the belt tension adjustment apparatus 1900 according to this invention. Each end of the tension spring 1920 is attached to the end of the plate spring 1910 to provide an auxiliary elastic force in the plate spring 1910. This auxiliary elastic force serves to prevent elastic fatigue in the spring plate 1910 due to prolonged use or environment factors such as temperature variation inside a container during shipment.

Each end of the tension spring 1920 is connected to the respective ends of the plate spring 1910. To facilitate the engagement between the tension spring 1920 and the plate spring 1910, each end of the plate spring 1910 has a latching groove structure 1914 and each end of the tension spring 1920 has a latching hook 1922.

Hence, the latching hooks 1922 at the ends of the tension spring 1920 may hook onto the corresponding latching groove structures 1914 at the ends of the plate spring 1910 to form an integrative unit.

Figure 5A:
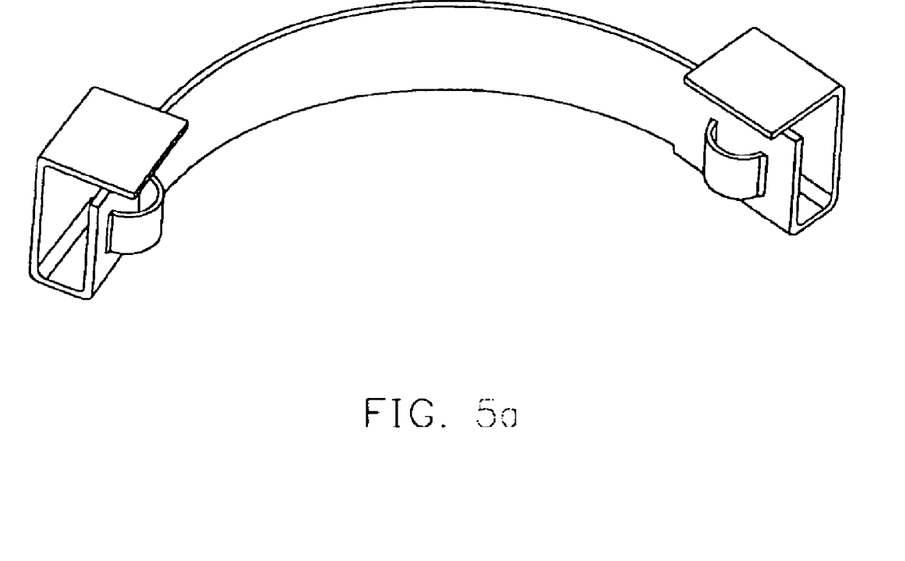
FIG. 5a is a perspective view of a belt tension adjustment apparatus before the application of any external force according to the invention.
Figure 5B:
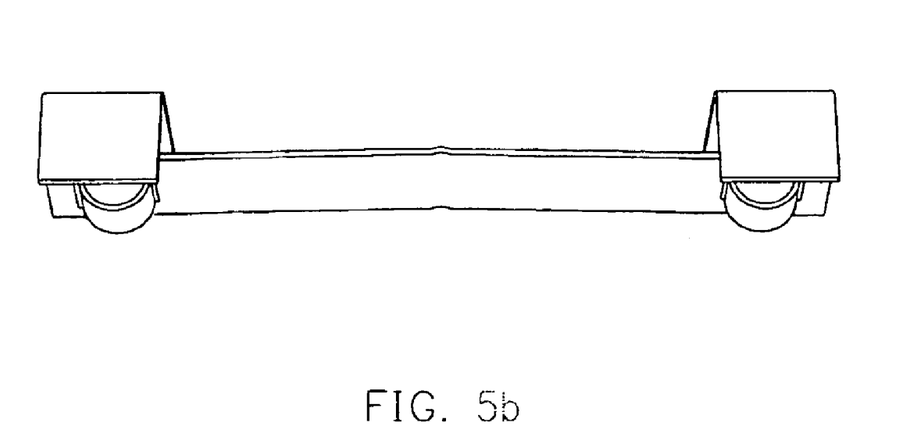
FIG. 5b is a perspective view of a belt tension adjustment apparatus after the apparatus is stretched to a fully open configuration.
Figure 5C:
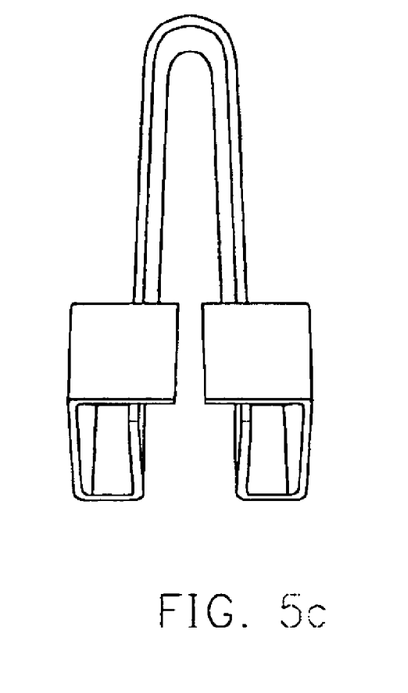
FIG. 5c is a perspective view of a belt tension adjustment apparatus after the apparatus is stretched to a fully close configuration.

FIG. 5a is a perspective view of the plate spring 1910 before the application of any external force. The bow-shaped plate spring 1910 may be fully opened to produce a first configuration (as shown in FIG. 5b) or fully closed to produce a second configuration (as shown in FIG. 5c) when subjected to an external force. In other words, the first configuration and the second configuration are the possible range of deformation for the plate spring 1910. When the plate spring 1910 is fastened to the transmission belt 1700 as shown in FIG. 3, the plate spring 1910 is in a third configuration intermediate between the fully opened first configuration as shown in FIG. 5a and the fully closed second configuration as shown in FIG. 5b. In other words, the plate spring 1910 provides an elastic tension in the transmission belt 1700 by bending a portion of the belt in such a way that the tension provided by the plate spring 1910 is always within the elastic range of the plate spring 1910.

In order to adjust or repair the optical scanner, the transmission belt 1700 has to be dismantled. To dismantle the transmission belt 1700, all one has to do is to apply force to the plate spring 1910 and open up the plate spring 1910 to the first configuration (without exceeding elastic limit). When the plate spring 1910 is in the first configuration, tension in the transmission belt 1700 is released and hence the transmission belt 1700 can be easily slipped away from the belt wheels 1720.

Figure 6:
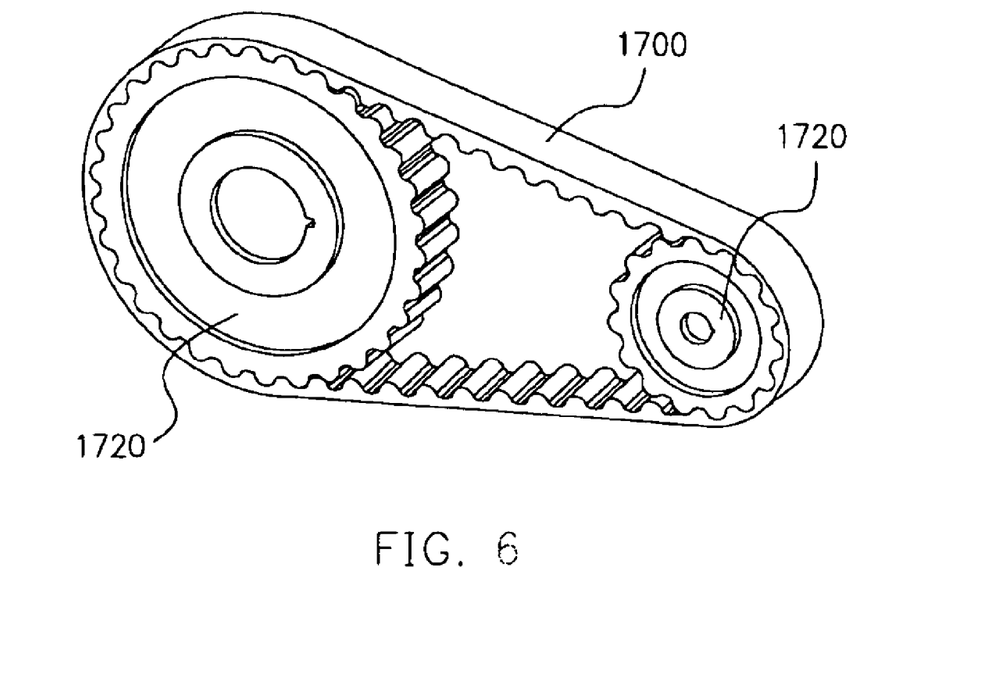
FIG. 6 is a perspective view of a transmission belt with internal teeth wrapped around a pair of belt wheels according to the invention.

Furthermore, the transmission belt 1700 can have a tooth internal profile as shown in FIG. 6, and the rim of the belt wheels 1720 can contain a set of gear teeth.

In conclusion, major advantages of this invention include:

1. Through the belt tension adjustment apparatus such as the plate spring, a portion of the transmission belt is bent to produce a tension in the belt. The plate spring may further incorporate with a tension spring to provide an auxiliary tension in the belt. The tension spring not only extends the working life of the apparatus, but also prevents other external factors from interfering with its proper function.

2. Tension in the transmission belt is easily adjusted by applying a force to open up the plate spring. Thus, the transmission belt can be mounted or dismounted with ease during assembly, maintenance or adjustment.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A belt tension adjustment apparatus for providing a tension in a transmission belt inside a station, wherein the station at least comprises a main body casing, a pair of belt wheels and a transmission system, the belt wheels, the transmission system and the transmission belt are all enclosed inside the main body casing, the transmission belt is wrapped around the belt wheels, the transmission system is coupled to one of the belt wheels, and the belt tension adjustment apparatus comprising:

a plate spring having a bow in the middle with ends gripping the transmission belt such that a section of the transmission belt forms a bend to provide a proper tension in the belt; and a tension spring whose ends are connected to the ends of the plate spring.

2. The belt tension adjustment apparatus of claim 1, wherein the tension spring is a helical tension spring.

3. The belt tension adjustment apparatus of claim 1, wherein the plate spring further comprises a latching groove structure at each end of the plate spring and a latching hook at each end of the tension spring, and the latching hooks at the end of the tension spring are engaged to the latching groove structures at the end of the plate spring.

4. The belt tension adjustment apparatus of claim 1, wherein the transmission system further comprises an electric motor and a gearset, the motor couples with the gearset and the gearset is coupled to one of the belt wheels so that the motor is able to drive one of the belt wheels.

5. The belt tension adjustment apparatus of claim 1, wherein the transmission belt comprises a belt with internal teeth.

6. A belt tension adjustment apparatus for an optical scanner, wherein the optical scanner comprises at least a main body casing, a scanning module, a transmission system, a pair of belt wheels and a transmission belt, the main body casing has a transparent platform thereon, the scanning module is capable of reciprocating forward and backward inside the main body casing underneath the transparent platform to scan a document placed over the transparent platform, the transmission system, the transmission belt and the belt wheels are all enclosed inside the main body casing, and the transmission system is coupled to one of the belt wheels for driving the transmission belt and hence moving the scanning module that attaches to the belt, comprising:

a plate spring having a bow in the middle with ends gripping the transmission belt so that a section of the transmission belt bends to provide a tension in the belt; and a tension spring whose ends are engaged to the respective end of the plate spring.

7. The belt tension adjustment apparatus of claim 6, wherein the plate spring deforms elastically between a first configuration with the plate spring fully opened and a second configuration with the plate spring fully closed, and the plate spring is in a third configuration intermediate between the first configuration and the second configuration when the plate spring is mounted on the transmission belt.

8. The belt tension adjustment apparatus of claim 6, wherein the plate spring further comprises a gripping structure at each end of the plate spring for gripping the transmission belt.

9. The belt tension adjustment apparatus of claim 6, wherein the plate spring further comprises a latching groove structure at each end of the plate spring and a latching hook at each end of the tension spring, and the latching hooks at the end of the tension spring are engaged to the latching groove structures at the end of the plate spring.

10. The belt tension adjustment apparatus of claim 6, wherein the transmission system further comprises an electric motor and a gearset, the motor couples with the gearset and the gearset is coupled to one of the belt wheels so that the motor is able to drive one of the belt wheels.

11. The belt tension adjustment apparatus of claim 6, wherein the transmission belt comprises a belt with internal teeth.

12. An optical scanner, comprising:

a main body casing having a transparent platform thereon;

a pair of belt wheels inside the main body casing;

a transmission belt inside the main body casing and wrapped around the belt wheels;

a scanning module capable of reciprocating forward and backward inside the main body casing underneath the transparent platform, wherein the scanning module is attached to the transmission belt and hence is driven by the belt;

a transmission system inside the main body casing and coupled with one of the belt wheels for driving the belt wheel; and a tension adjustment apparatus mounted on the transmission belt for adjusting tension in the belt, wherein the tension adjustment apparatus further comprises a tension spring whose ends engage with the respective end of the plate spring.

13. The optical scanner of claim 12, wherein the tension adjustment apparatus further comprises a plate spring having a bow in the middle with ends gripping the transmission belt so that a section of the belt bends to produce a tension in the belt.

14. The optical scanner of claim 12, wherein the tension spring is a helical tension spring.

15. The optical scanner of claim 12, wherein the transmission system further comprises an electric motor and a gearset, the motor couples with the gearset and the gearset is coupled to one of the belt wheels so that the motor is able to drive one of the belt wheels.

16. The optical scanner of claim 12, wherein the transmission belt comprises a belt with internal teeth.

* * * * *